US012585766B2

(12) United States Patent (10) Patent No.: US 12,585,766 B2
Uretzky et al. (45) Date of Patent: Mar. 24, 2026

(54) INTERMITTENT ENCRYPTION ATTACK

(71) Applicant: HEWLETT PACKARD ENTERPRISE DEVELOPMENT LP, Spring, TX (US)

(72) Inventors: Omer Uretzky, Herzliya (IL); Gil Barash, Herzliya (IL)

(73) Assignee: Hewlett Packard Enterprise Development LP, Spring, TX (US)

( * ) Notice: Subject to any disclaimer, the term of this patent is extended or adjusted under 35 U.S.C. 154(b) by 38 days.

(21) Appl. No.: 18/418,548

(22) Filed: Jan. 22, 2024

(65) Prior Publication Data

US 2025/0238504 A1 Jul. 24, 2025

(51) Int. Cl.
*G06F 21/55* (2013.01)
*G06F 21/56* (2013.01)

(52) U.S. Cl.
CPC .......... *G06F 21/554* (2013.01); *G06F 21/565* (2013.01); *G06F 21/566* (2013.01)

(58) Field of Classification Search
CPC ..... G06F 21/554; G06F 21/565; G06F 21/566
See application file for complete search history.

(56) References Cited

U.S. PATENT DOCUMENTS

| | | | | |
|---|---|---|---|---|
| 11,650,749 B1 * | 5/2023 | Tran | ......................... | G06F 3/067 |
| | | | | 711/165 |
| 2011/0040963 A1 * | 2/2011 | Chida | ....................... | H04L 9/30 |
| | | | | 713/150 |

| | | | | |
|---|---|---|---|---|
| 2021/0216630 A1 * | 7/2021 | Karr | .................... | H04L 63/1416 |
| 2024/0363099 A1 * | 10/2024 | Altaf | ....................... | G10L 15/02 |

OTHER PUBLICATIONS

Aslan et al., A Review of Cloud-Based Malware Detection System: Opportunities, Advances and Challenges, Mar. 2021 (8 pages).
Gagulic et al., Ransomware Detection with Machine Learning in Storage Systems, Feb. 13, 2023 (114 pages).
Min et al., "A Content-Based Ransomware Detection and Backup Solid-State Drive for Ransomware Defense", Jul. 2022 (14 pages).
Wikipedia, Entropy (information theory), available online at <https://en.wikipedia.org/w/index.php?tittle=Entropy%20(information_theory&oldid=1190498462>, downloaded Jan. 3, 2024 (19 pages).
Zhou et al., Limits of I/O Based Ransomware Detection: An Imitation Based Attack, May 2023 (18 pages).
Aleksandar Milenkoski, "Crimeware Trends | Ransomware Developers Turn to Intermittent Encryption to Evade Detection", available online at <https://www.sentinelone.com/labs/crimeware-trends-ransomware-developers-turn-to-intermittent-encryption-to-evade-detection/>, Sep. 8, 2022, 13 pages.

(Continued)

*Primary Examiner* — Khoi V Le
(74) *Attorney, Agent, or Firm* — Trop, Pruner & Hu, P.C.

(57) ABSTRACT

In some examples, a system identifies, from among a plurality of input/output (I/O) operations with a storage system, a subset of I/O operations involving encrypted data segments of a given data size. The system computes a measure based on a quantity of the I/O operations in the subset of I/O operations involving the encrypted data segments of the given data size. Based on the measure, the system determines whether an intermittent encryption attack is occurring with respect to the storage system.

18 Claims, 5 Drawing Sheets

(56) References Cited

OTHER PUBLICATIONS

Checkpoint, "What is Ransomware?", available online at <https://web.archive.org/web/20200812100814/https://www.checkpoint.com/cyber-hub/threat-prevention/ransomware/>, Aug. 12, 2020, 9 pages.

Mark Loman, "LockFile ransomware's box of tricks: intermittent encryption and evasion", available online at <https://news.sophos.com/en-us/2021/08/27/lockfile-ransomwares-box-of-tricks-intermittent-encryption-and-evasion/>, Aug. 27, 2021, 25 pages.

Steve Morgan, "Global Ransomware Damage Costs Predicted To Exceed $265 Billion By 2031", available online at <https://web.archive.org/web/20230605014158/https://cybersecurityventures.com/global-ransomware-damage-costs-predicted-to-reach-250-billion-usd-by-2031/>, Jun. 2, 2022, 11 pages.

* cited by examiner

400

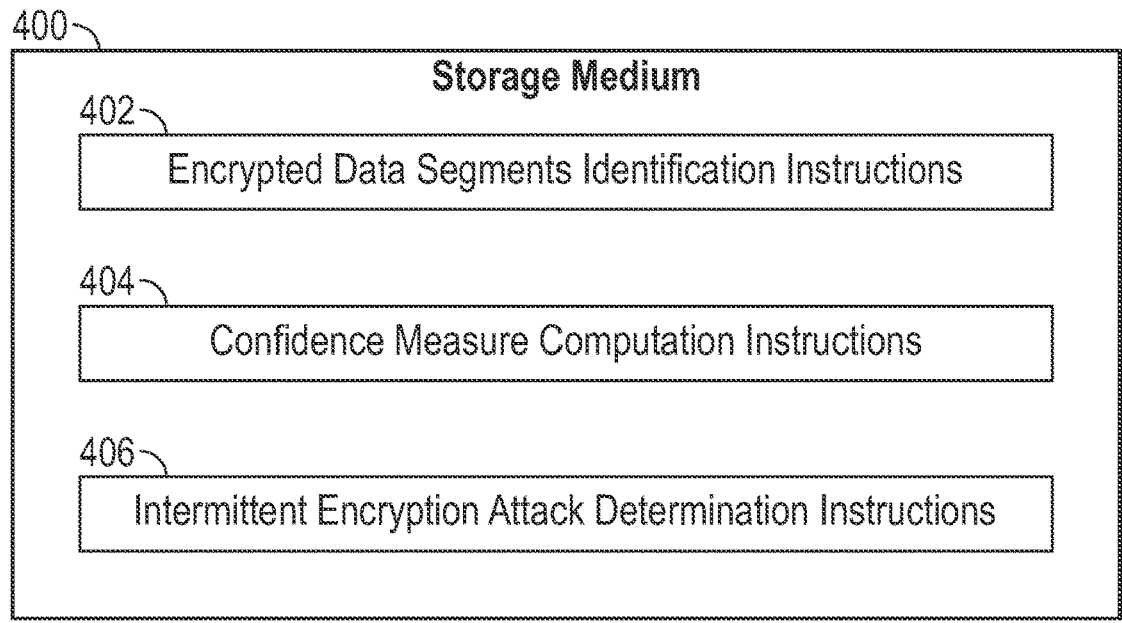

Storage Medium

402

Encrypted Data Segments Identification Instructions

404

Confidence Measure Computation Instructions

406

Intermittent Encryption Attack Determination Instructions

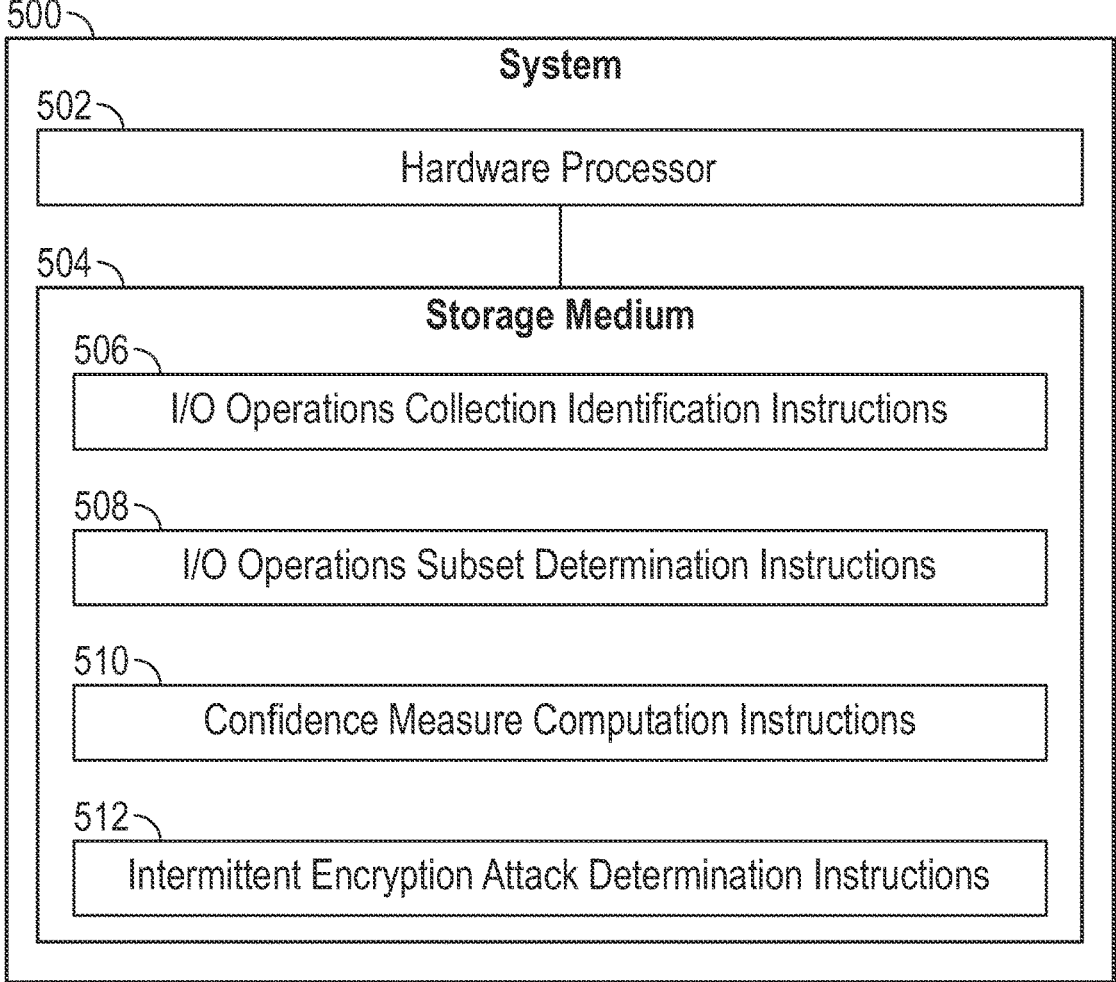

System

502

Hardware Processor

504

Storage Medium

506

I/O Operations Collection Identification Instructions

508

I/O Operations Subset Determination Instructions

510

Confidence Measure Computation Instructions

512

Intermittent Encryption Attack Determination Instructions

FIG. 5

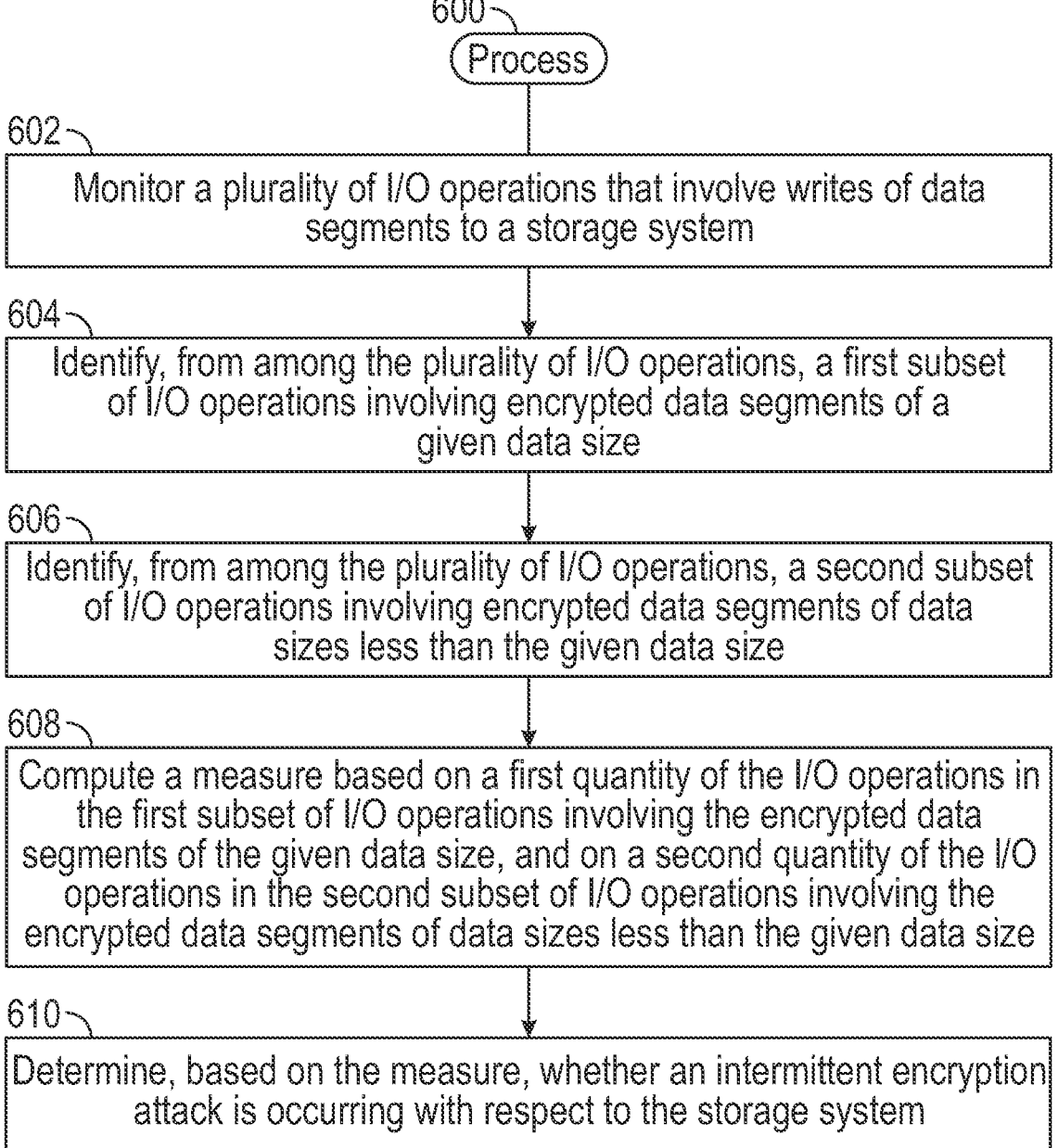

600 ⌐

( Process )

602 ⌐

Monitor a plurality of I/O operations that involve writes of data segments to a storage system

604 ⌐

Identify, from among the plurality of I/O operations, a first subset of I/O operations involving encrypted data segments of a given data size

606 ⌐

Identify, from among the plurality of I/O operations, a second subset of I/O operations involving encrypted data segments of data sizes less than the given data size

608 ⌐

Compute a measure based on a first quantity of the I/O operations in the first subset of I/O operations involving the encrypted data segments of the given data size, and on a second quantity of the I/O operations in the second subset of I/O operations involving the encrypted data segments of data sizes less than the given data size

610 ⌐

Determine, based on the measure, whether an intermittent encryption attack is occurring with respect to the storage system

FIG. 6

INTERMITTENT ENCRYPTION ATTACK

BACKGROUND

A ransomware attack involves encrypting data on a computer or on multiple computers connected over a network. In a ransomware attack, data can be encrypted using an encryption key, which renders the data inaccessible to users unless a ransom is paid to obtain the encryption key. A ransomware attack can be highly disruptive to enterprises, including businesses, government agencies, educational organizations, individuals, and so forth.

BRIEF DESCRIPTION OF THE DRAWINGS

Some implementations of the present disclosure are described with respect to the following figures.

FIG. 4 is a block diagram of a storage medium storing machine-readable instructions according to some examples.

FIG. 5 is a block diagram of a system according to some examples.

FIG. 6 is a flow diagram of a process according to some examples.

Figure 1:
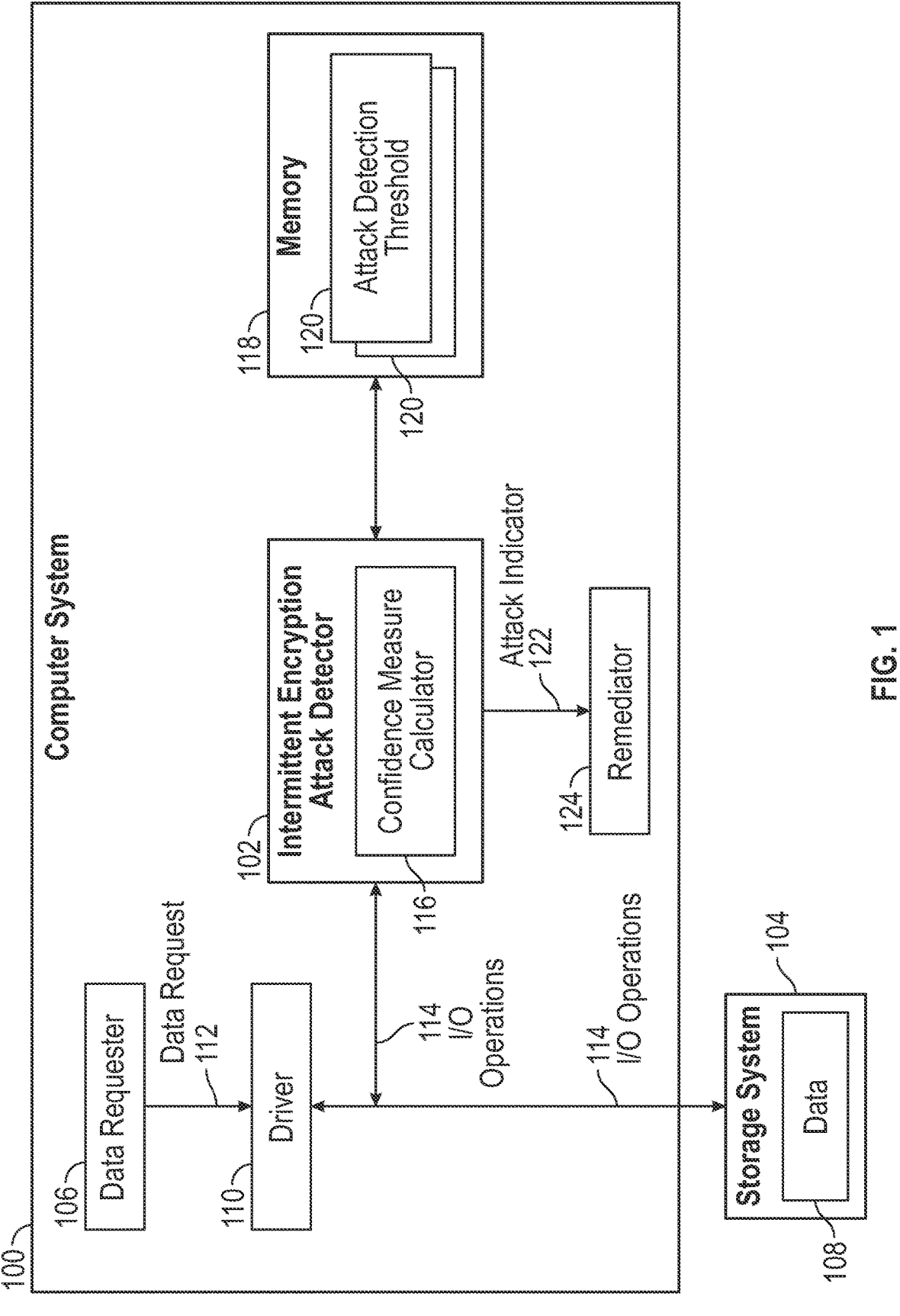
FIG. 1 is a block diagram of a computer system including an intermittent encryption attack detector, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A ransomware attack can be difficult to detect. By the time a user (e.g., an individual human user, an organization such as a business, a government, or an educational organization, or any other type of entity) becomes aware of the attack, most or all of the data may have been encrypted and thus inaccessible. An inability to detect a ransomware attack in real time may reduce a user's ability to recover from the attack.

In some cases, ransomware can encrypt an entire data object, where a "data object" can refer to any or some combination of the following: a file of a filesystem, an image, a video, an executable program code, or any other container of data. In other cases, ransomware can perform intermittent encryption of a data object, in which the ransomware encrypts selected portions of the data object but not other portions of the data object. Although ransomware protection systems may be able to detect ransomware that encrypts entire data objects, such ransomware protection systems may not work against ransomware that applies intermittent encryption. As a result, a ransomware attack may escape detection, and any partially encrypted (intermittently encrypted) data objects are lost since a user may not be able to recover original data from the partially encrypted data objects.

In accordance with some implementations of the present disclosure, an intermittent encryption attack detector is able to determine whether an intermittent encryption attack is occurring based on monitoring data sizes of input/output (I/O) operations with a storage system. The intermittent encryption attack detector identifies, from among a plurality of I/O operations with the storage system, a subset of I/O operations involving encrypted data of a given data size. The intermittent encryption attack detector computes a measure based on a quantity of the I/O operations in the subset of I/O operations involving the encrypted data of the given data size, and determines, based on the measure, whether an intermittent encryption attack is occurring with respect to the storage system.

An "encryption attack" refers to any collection of one or more data encryption operations that are not authorized. During normal operations in the computer system, data encryption may be performed to protect the data against unauthorized access. Such data encryption operations associated with planned or programmed operations are considered authorized data encryption operations. However, unauthorized data encryption operations may be performed by an attacker, including a human user, a program, or a machine.

An example of an encryption attack is performed by ransomware, which includes malware that has been launched in a system to perform encryption of data. The entity that initiated the ransomware attack typically attempts to extract payments (the ransom) from a victim of the ransomware attack, in exchange for an encryption key that can be used by the victim to decrypt the encrypted data. In other examples, encryption attacks may be performed in other contexts by attackers.

An intermittent encryption attack refers to an encryption attack in which less than the entirety of a data object is encrypted. An example of an intermittent encryption attack involves skip-step encryption, in which every Y-byte segment of a data object is encrypted, while skipping N-byte segments between the Y-byte segments. The values of Y and N can be arbitrarily selected by an attacker. Y and N have different values. In some examples, Y is less than N. An intermittent encryption attack may seek to encrypt smaller size segments and leave larger size segments unencrypted in an effort to try to evade ransomware protection systems that are able to detect encryption of data.

Another type of intermittent encryption attack involves fast encryption, in which the first Y bytes of a data object are encrypted, while the remainder of the data object is not encrypted. Another type of an intermittent encryption attack involves percent encryption, in which every Y-byte segment of a data object is encrypted, while skipping P-byte segments between the Y-byte segments, where P is set based on a target P % of the total size of the data object. The values of Y and P can be arbitrarily selected by an attacker.

More generally, an intermittent encryption attack seeks to encrypt one or more sub-portions of a data object. A "sub-portion" of a data object refers to a part of the data object, where the part has a target size less than the total size of the data object. In cases where a given data object has a total size less than the target size, the intermittent encryption attack would encrypt the entirety of the given data object.

Although the foregoing refers to segments of certain number of bytes (e.g., Y, N, P), in other examples, an intermittent encryption attack can encrypt segments of any given data size. An intermittent encryption attack detector according to some examples of the present disclosure identifies I/O operations involving encrypted data segments of the given data size (e.g., Y-byte size), and computes a measure based on a quantity of I/O operations involving the encrypted data segments of the given data size. The intermittent encryption attack detector compares the measure to one or more thresholds to determine whether an intermittent encryption attack is occurring.

FIG. 1 is a block diagram of a computer system 100 that includes an intermittent encryption attack detector 102. The intermittent encryption attack detector 102 can be implemented with one or more hardware processing circuits, which can include any or some combination of a microprocessor, a core of a multi-core microprocessor, a microcontroller, a programmable integrated circuit, a programmable gate array, or another hardware processing circuit. Alternatively, the intermittent encryption attack detector 102 can be implemented with a combination of one or more hardware processing circuits and machine-readable instructions (software and/or firmware) executable on the one or more hardware processing circuits.

Examples of the computer system 100 can include any or some combination of the following: a collection of computers (e.g., server computers, desktop computers, notebook computers, tablet computers, or other types of computers), a collection of smartphones, a collection of Internet of Things (IoT) devices, a collection of household appliances, a collection of vehicles, a collection of game appliances, or a collection of other types of electronic devices. As used here, a "collection" of items can refer to a single item or multiple items.

A storage system 104 is coupled to the computer system 100. The storage system 104 may be inside the computer system 100, or alternatively, may be outside the computer system 100. The storage system 104 can be implemented using a collection of storage devices. Examples of storage devices can include any or some combination of the following: disk-based storage devices, solid state drives, or other types of storage devices.

The computer system 100 includes a data requester 106 that is able to issue a data request (112) to access (read or write) data 108 stored in the storage system 104. The data requester 106 may include a human, a program (e.g., an application program, an operating system (OS), firmware, or any other type of program including machine-readable instructions), or an electronic component. There may be multiple data requesters in the computer system 100 that are able to access data of the storage system 104. In some examples, the data requester 106 may include a virtual machine (VM), which provides a virtualized computing environment that emulates a physical computing environment. In other examples, the data requester 106 can include a container or any other type of virtualized computing environment. In further examples, the data requester 106 does not operate in a virtualized computing environment.

Data requesters may also be outside the computer system 100. Such external data requesters can submit data requests to the computer system 100, for accessing the data 108 of the storage system 104.

The computer system 100 includes a driver 110. In some examples, the driver 110 may be part of an OS of the computer system 100. In other examples, the driver 110 may be part of a hypervisor (also referred to as a virtual machine monitor (VMM) or any other type of a virtualization management program. A hypervisor is used to create and manage VMs and the computer system 100. Another example of a virtualization management program is a container engine that can start and manage containers in the computer system 100.

A "driver" can refer to a program that manages access to the storage system 104. In response to data requests from data requesters, the driver 110 can issue corresponding input/output (I/O) operations 114 that perform the access (reads and/or writes) of the data 108 in the storage system 104 according to the data requests.

In accordance with some implementations of the present disclosure, the intermittent encryption detector 102 is able to monitor the I/O operations 114 for the purpose of determining whether an intermittent encryption attack is occurring. Based on the I/O operations 114, a confidence measure calculator 116 in the intermittent encryption detector 102 computes a confidence measure, which provides an indication of whether or not a data encryption attack is likely occurring. The confidence measure calculator 116 can be implemented using a portion of the hardware processing circuitry of the intermittent encryption detector 102, or with machine-readable instructions executable by the intermittent encryption detector 102.

A memory 118 stores one or more attack detection thresholds 120. The intermittent encryption detector 102 compares a confidence measure computed by the confidence measure calculator 116 to the one or more attack detection thresholds 120. Based on the comparison of the computed confidence measure to the one or more attack detection thresholds 120, the intermittent encryption detector 102 produces an attack indicator 122. The attack indicator 122 can have any one of multiple different values. A first value can indicate that no intermittent encryption attack is likely occurring. A second value of the attack indicator 122 may indicate that an encryption attack is likely occurring. In some cases, the attack indicator 122 can be set to more than two values. In such examples, the different values of the attack indicator 122 can indicate different likely confidence levels relating to the intermittent encryption attack detection. A higher confidence level can indicate that an intermittent encryption attack is more likely than a lower confidence level.

Although the foregoing refers to an example in which the first value of the attack indicator 122 indicates that no intermittent encryption attack is occurring, in other examples, an absence of the attack indicator 122 indicates that no intermittent encryption attack is occurring. In other words, the intermittent encryption attack detector 102 does not output the attack indicator 122 if the confidence measure computed by the confidence measure calculator 116 indicates that an intermittent encryption attack is likely not present.

The computer system 100 may also include a remediator 124 that can take one or more remediation actions in response to the attack indicator 122 indicating that an encryption attack may be occurring. The remediator 124 may be implemented using one or more hardware processing circuits, or machine-readable instructions executed on one or more hardware processing circuits.

The remediation actions taken by the remediation by the remediator 124 can include any or some combination of the following: providing an alert of the encryption attack, disabling components of the computer system 100 (e.g., stopping programs, shutting down electronic components, disabling network access, etc.), disabling the entire computer system 100 (e.g., placing the computer system 100 in a lower power state such as a sleep state or a power off state), or any other remediation action.

In other examples, the remediator 124 may be outside the computer system 100. In such examples, the computer system 100 can send, such as in a message or an information element, the attack indicator 122 to the remediator 124, such as over a network.

The following provides an example where four attack detection thresholds 120 are employed. The four attack detection thresholds are represented as Th1, Th2, Th3, and Th4, where Th1<Th2<Th3<Th4. If a confidence measure (confidence) computed by the confidence measure calculator 116 is less than Th1, then that indicates no intermittent encryption attack is likely occurring and thus no remediation action is taken. If confidence<Th1, the intermittent encryption attack detector 102 does not output the attack indicator 122 (or sets the attack indicator 122 to a "no attack" value to indicate no attack is occurring).

If Th1≤confidence<Th2, the intermittent encryption attack detector 102 sets the attack indicator 122 to a "warning" value. In response to the "warning" value of the attack indicator 122, the remediator 124 issues a warning to a target entity, such as a human user, a program, or a machine.

If Th2≤confidence<Th3, the intermittent encryption attack detector 102 sets the attack indicator 122 to an "error" value. In response to the "error" value of the attack indicator 122, the remediator 124 issues an error message to the target entity, such as a human user, a program, or a machine. The error message indicates to the target entity that an error has occurred in the computer system 100.

If Th3≤confidence<Th4, the intermittent encryption attack detector 102 sets the attack indicator 122 to a "critical" value. In response to the "critical" value of the attack indicator 122, the remediator 124 disables a target feature of the computer system 100, where the target feature disabled can include a program, an electronic component, a network interface, the entire computer system 100, or any other feature. The disabling of the target feature can prevent further write I/O operations, for example.

The "no attack" value, "warning" value, "error" value, and "critical" value can be any arbitrarily set values, including different numerical values, different alphanumeric strings, or other values.

Figure 2:
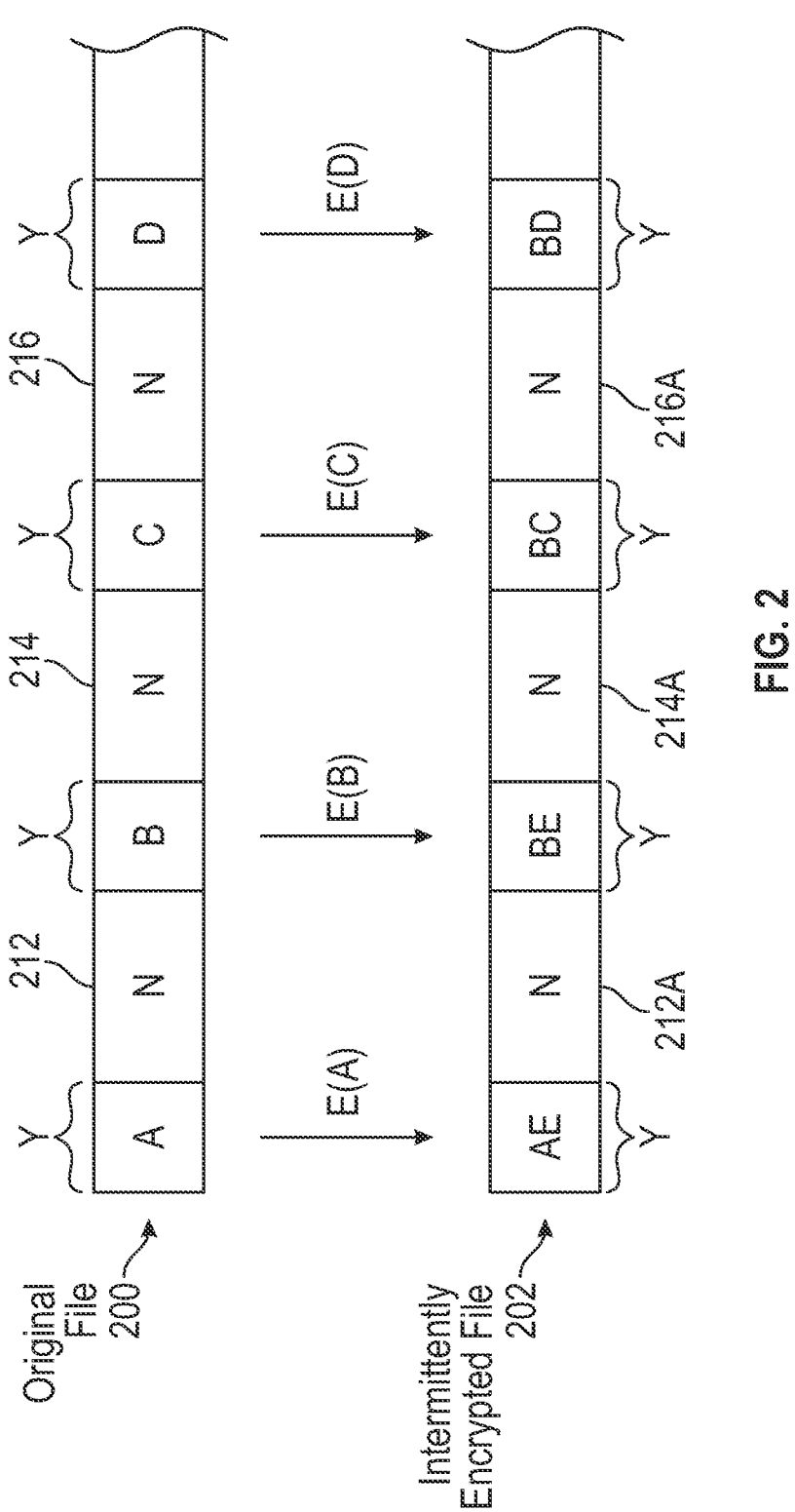
FIG. 2 is a schematic diagram of an intermittent encryption of a file, according to some examples.
Figure 3:
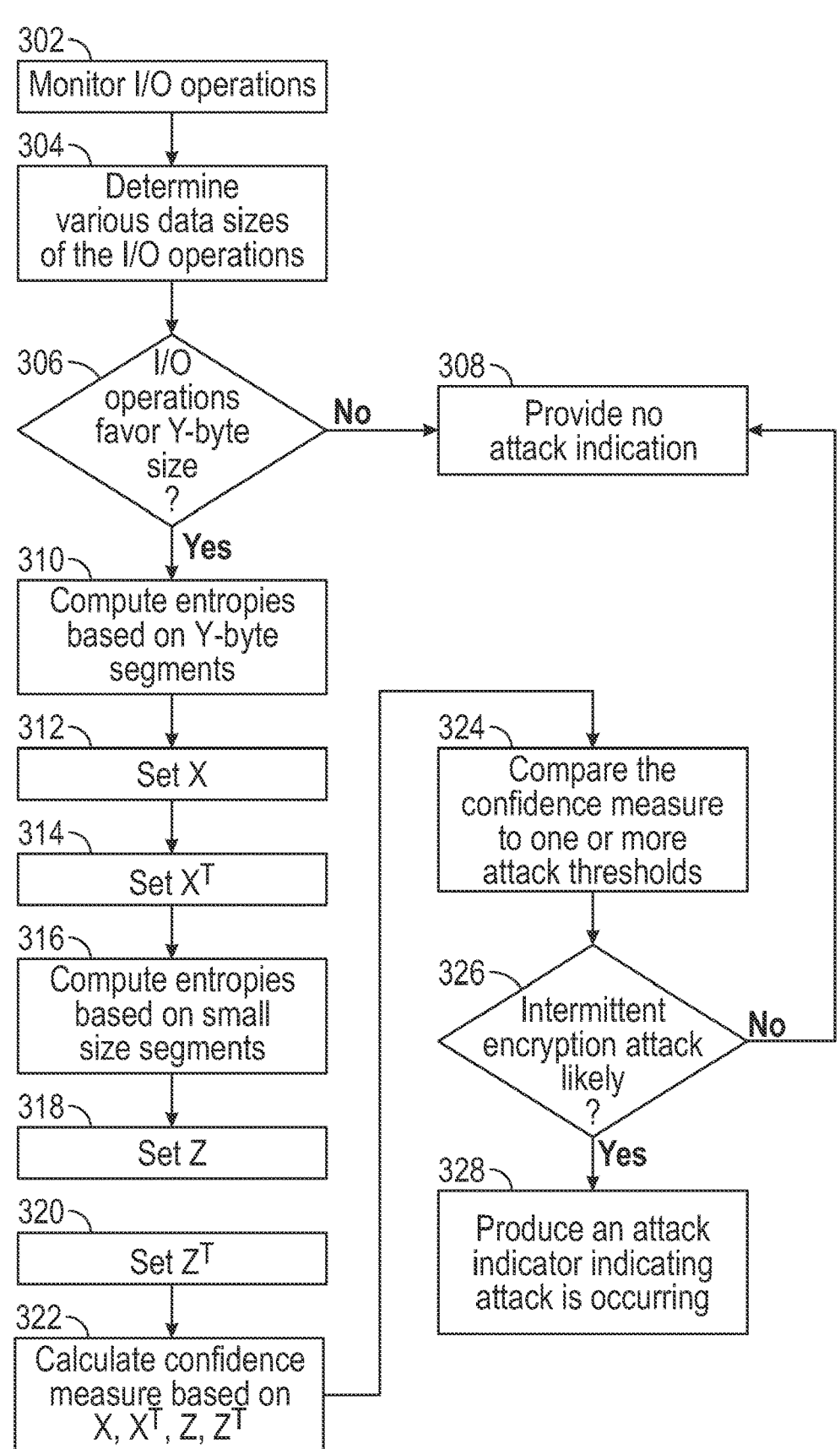
FIG. 3 is a flow diagram of the process of detecting an intermittent encryption attack, according to some examples.

The following refers to FIG. 2 and FIG. 3. FIG. 2 is a schematic diagram showing an intermittent encryption attack. FIG. 3 is a flow diagram of a process of detecting an intermittent encryption attack, according to some examples of the present disclosure. The process can be performed by the intermittent encryption attack detector 102, for example. Although FIG. 3 shows a specific order of tasks, in other examples, the tasks may be performed in a different order, some of the tasks may be omitted, and other tasks may be added.

FIG. 2 shows an original file 200 (that has not been encrypted) that includes Y-byte segments A, B, C, and D (i.e., each of A, B, C, and D is Y bytes in length, where Y≥1). N-byte segments are provided between successive pairs of Y-byte segments in the original file 200. A single N-byte segment is provided between any successive pair of Y-byte segments in the original file 200. A "successive pair" of Y-byte segments refers to two Y-byte segments in a file (or other data object) that are separated by just a single N-byte segment.

Intermittent encryption of the original file 200 (e.g., by ransomware) produces an intermittently encrypted file 202. The intermittent encryption applies an encryption, E(A) on Y-byte segment A, skips the next N-byte segment 212, applies an encryption, E(B) on Y-byte segment B, skips the next N-byte segment 214, applies an encryption, E(C) on Y-byte segment C, skips the next N-byte segment 216, applies an encryption, E(D) on Y-byte segment D, and so forth.

The intermittently encrypted file 202 includes an encrypted Y-byte segment AE, followed by unencrypted N-byte segment 212A, followed by an encrypted Y-byte segment BE, followed by unencrypted N-byte segment 214A, followed by an encrypted Y-byte segment CE, followed by unencrypted N-byte segment 216A, and so forth. Note that an unencrypted N-byte segment in the intermittently encrypted file 202 is identical to the corresponding N-byte segment in the original file 200. For example, the unencrypted N-byte segment 212A is identical to the N-byte segment 212, the unencrypted N-byte segment 214A is identical to the N-byte segment 214, and the unencrypted N-byte segment 216A is identical to the N-byte segment 216.

As shown in FIG. 3, the intermittent encryption attack detector 102 monitors (at 302) I/O operations that write data to a storage system (e.g., the storage system 104 of FIG. 1). In FIG. 1, the I/O operations are produced by the driver 110 in response to data requests from one or more data requesters 106. The intermittent encryption attack detector 102 determines (at 304) various data sizes of the I/O operations, where a "data size" (or more simply a "size") of an I/O operation refers to the size of data written to the storage system in the I/O operation. The intermittent encryption attack detector 102 determines (at 306) whether the I/O operations favor a given data size (e.g., Y-byte segments). I/O operations "favor" the given data size if the quantity of I/O operations of the given data size exceeds I/O operations of the next most popular data size by greater than a specified margin. It is expected that if an intermittent encryption attack is occurring, there would be a greater quantity of I/O operations of the same data size (e.g., the Y-byte size).

If intermittent encryption attack detector 102 determines (at 306) that the I/O operations do not favor any data size, then the intermittent encryption attack detector 102 provides (at 308) an indication of "no attack," which may include setting the attack indicator 122 to the "no attack" value, or not outputting the attack indicator 122 at all.

If intermittent encryption attack detector 102 determines (at 306) that the I/O operations favor the given data size (which in the present example is assumed to be the Y-byte size), the intermittent encryption attack detector 102 computes (at 310) an entropy based on each Y-byte segment. In some examples, the entropy calculated can include Shannon entropy. If the Shannon entropy computed based on any data segment (which can refer to a part of a data object or an entirety of the data object) exceeds a specified entropy threshold, then that indicates that the data segment has been encrypted. If the Shannon entropy computed based on a data segment is does not exceed the specified threshold, then that indicates the data segment is not encrypted.

Based on the entropies computed for Y-byte I/O operations (I/O operations that write Y-byte segments), the intermittent encryption attack detector 102 sets (at 312) a value X that represents a first quantity of Y-byte I/O operations that encrypted data (i.e., Y-byte segments produced by this first quantity of Y-byte I/O operations have entropies that exceed the specified entropy threshold). The intermittent encryption attack detector 102 also sets (at 314) a value $X^T$ that represents a total quantity of Y-byte I/O operations. The total quantity of Y-byte I/O operations include a sum of the first quantity of Y-byte I/O operations that encrypted data and a second quantity of Y-byte I/O operations that did not encrypt data (i.e., Y-byte segments produced by this second quantity of Y-byte I/O operations have entropies that do not exceed the specified entropy threshold).

It is also possible that files (or more generally data objects) that are smaller than Y bytes may have been encrypted. Such small files (or more generally data objects) would be encrypted in their entirety since they are smaller than Y bytes. The example assumes that the intermittent encryption attack targets segments of files (or more generally data objects) of the Y-byte size that is less than the size of unencrypted segments (e.g., the N-byte segments of the skip-step encryption or the fast encryption discussed further above, or the P-byte segments of the percent encryption discussed further above).

The intermittent encryption attack detector 102 computes (at 316) the entropy for each "small size" segment. A "small size" segment is a data segment of size less than Y bytes written by an I/O operation (such an I/O operation is referred to as a "small size I/O operation"). Based on the entropies computed for small size I/O operations, the intermittent encryption attack detector 102 sets (at 318) a value Z that represents a third quantity of small size I/O operations that encrypted data (i.e., small size segments produced by this third quantity of small size I/O operations have entropies that exceed the specified entropy threshold). The intermittent encryption attack detector 102 also sets (at 320) a value $Z^T$ that represents a total quantity of small size I/O operations. The total quantity of small size I/O operations is a sum of the third quantity of small size I/O operations that encrypted data and a fourth quantity of small size I/O operations that did not encrypt data (i.e., small size segments produced by this fourth quantity of small size I/O operations have entropies that do not exceed the specified entropy threshold).

The intermittent encryption attack detector 102 calculates (at 322) a confidence measure (confidence) based on the above computed X, $X^T$, Z, and $Z^T$ values, such as according to Eq. 1 below:

$$\text{confidence} = \left(\frac{X}{X^T} + \frac{Z}{Z^T}\right) * \frac{X^T}{T}, \qquad \text{(Eq. 1)}$$

where T represents the total quantity of I/O operations including the Y-byte I/O operations, small size I/O operations, and other I/O operations (including of unencrypted N-byte or P-byte segments). In other examples, other formulas for calculating confidence measures can be used.

In some examples, if an intermittent encryption attack were occurring, it is expected that the ratio $X/X^T$ is approximately 0.8 (or more generally, greater than 0.5), and the ratio $Z/Z^T$ is approximately 0.05 (or more generally, greater than 0.01). Based on the foregoing expected values of $X/X^T$ and $Z/Z^T$, one or more attack thresholds (e.g., Th1, Th2, Th3, and Th4 discussed above) may be set accordingly, such as by a human, a program, or a machine.

In some examples, greater values of X (representing a quantity of I/O operations involving encrypted Y-byte segments) and greater values of Z (representing a quantity of I/O operations involving encrypted small size segments) results in higher confidence values, which indicates that there is a greater confidence in a detection that an intermittent encryption attack is occurring. Larger values of X and of Z indicate that there are larger encrypted data segments as compared to unencrypted data segments.

The intermittent encryption attack detector 102 compares (at 324) the confidence measure (confidence) to the one or more attack thresholds. If based on the comparison, the intermittent encryption attack detector 102 determines (at 326) that an intermittent encryption attack is likely occurring, the intermittent encryption attack detector 102 produces (at 328) an attack indicator set to a value indicating such an attack. However, if based on the comparison, the intermittent encryption attack detector 102 determines (at

326) that an intermittent encryption attack is likely not occurring, the intermittent encryption attack detector 102 provides (at 308) an indication of "no attack."

In accordance with some examples of the present disclosure, an intermittent encryption attack can be detected based on analyzing data segments rather than just entire data objects. In some examples, the intermittent encryption attack can be detected can be detected in real time, i.e., as the I/O operations are executing.

FIG. 4 is a block diagram of a non-transitory machine-readable or computer-readable storage medium 400 storing machine-readable instructions that upon execution cause a system to perform various tasks. A "system" can refer to one or more computers.

The machine-readable instructions include encrypted data segments identification instructions 402 to identify, from among a plurality of I/O operations with a storage system, a subset of I/O operations involving encrypted data segments of a given data size. An example of the "given data size" is the Y-byte size discussed above, which is a target data size of data segments of data objects that an attacker seeks to encrypt using an intermittent encryption attack. The storage system may be part of the one or more computers, or may be remote from the one or more computers.

The machine-readable instructions include confidence measure computation instructions 404 to compute a measure based on a quantity of the I/O operations in the subset of I/O operations involving the encrypted data segments of the given data size. In some examples, the measure is computed according to Eq. 1. In other examples, the measure is computed using another formula that produces an output indicating higher confidence levels of intermittent encryption detection for higher quantities of I/O operations involving encrypted data segments of the given data size.

The machine-readable instructions include intermittent encryption attack determination instructions 406 to determine, based on the measure, whether an intermittent encryption attack is occurring with respect to the storage system. For example, the intermittent encryption attack determination instructions 406 can compare the measure to one or more attack thresholds.

In some examples, the machine-readable instructions identify, from among the plurality of I/O operations, a collection of I/O operations involving data segments of the given data size, where the subset of I/O operations is part of the collection of I/O operations. The measure is computed further based on a quantity of the I/O operations in the collection of I/O operations involving the data segments of the given data size.

In some examples, the collection of I/O operations involving the data segments of the given data size include I/O operations involving unencrypted data segments of the given data size, and the I/O operations in the subset of I/O operations involving the encrypted data segments of the given data size.

In some examples, the measure is based on a ratio between the quantity of the I/O operations in the subset of I/O operations and the quantity of the I/O operations in the collection of I/O operations.

In some examples, the machine-readable instructions identify, from among the plurality of I/O operations, a further subset of I/O operations involving encrypted data segments of data sizes less than the given data size. The measure is computed further based on a quantity of the I/O operations in the further subset of I/O operations involving the encrypted data segments of data sizes less than the given data size.

In some examples, the machine-readable instructions identify, from among the plurality of I/O operations, a collection of I/O operations involving data segments of data sizes less than the given data size, where the further subset of I/O operations is part of the collection of I/O operations involving data segments of data sizes less than the given data size. The measure is computed further based on a quantity of the I/O operations in the collection of I/O operations involving the data segments of data sizes less than the given data size.

In some examples, the I/O operations of the further subset of I/O operations include a write of a data object that has been entirely encrypted.

In some examples, the machine-readable instructions generate an error condition in the system based on the measure satisfying a first criterion. The "error condition" can include an alert indicating that an intermittent encryption attack may be occurring.

In some examples, the machine-readable instructions disable writes to the storage system based on the measure satisfying a second criterion. Writes are disabled by disabling or shutting down components, including programs, electronic components, entire computers, or other features. The first and second criteria can include attack thresholds as discussed above.

FIG. 5 is a block diagram of a system 500 according to some examples. The system 500 can be implemented using one or more computers. The system includes a hardware processor 502 (or multiple hardware processors). A hardware processor can include a microprocessor, a core of a multi-core microprocessor, a microcontroller, a programmable integrated circuit, a programmable gate array, or another hardware processing circuit.

The system 500 includes a storage medium 504 storing machine-readable instructions that are executable on the hardware processor 502 to perform various tasks. Machine-readable instructions executable on a hardware processor can refer to the instructions executable on a single hardware processor or the instructions executable on multiple hardware processors.

The machine-readable instructions in the storage medium 504 include I/O operations collection identification instructions 506 to identify, from among a plurality of I/O operations with a storage system, a first collection of I/O operations involving data segments of a given data size. The storage system may be part of the system 500 or remote from the system 500.

The machine-readable instructions in the storage medium 504 include I/O operations subset determination instructions 508 to determine, from the first collection of I/O operations, a first subset of I/O operations involving encrypted data segments of the given data size.

The machine-readable instructions in the storage medium 504 include confidence measure computation instructions 510 to compute a measure based on a first quantity of the I/O operations in the first subset of I/O operations involving the encrypted data segments of the given data size, and on a total quantity of the I/O operations in the first collection of I/O operations. The first quantity can be X, and the total quantity can be $X^T$, for example.

The machine-readable instructions in the storage medium 504 include intermittent encryption attack determination instructions 512 to determine, based on the measure, whether an intermittent encryption attack is occurring with respect to the storage system.

FIG. 6 is a flow diagram of a process 600 according to some examples. The process 600 may be performed by the intermittent encryption attack detector 102 of FIG. 1, for example.

The process 600 includes monitoring (at 602) a plurality of I/O operations that involve writes of data segments to a storage system. The plurality of I/O operations may be generated by the driver 110 of FIG. 1, for example, based on data requests from one or more data requesters.

The process 600 includes identifying (at 604), from among the plurality of I/O operations, a first subset of I/O operations involving encrypted data segments of a given data size. A determination of whether a data segment of the given data size is encrypted is based on computing an entropy based on the data segment.

The process 600 includes identifying (at 606), from among the plurality of I/O operations, a second subset of I/O operations involving encrypted data segments of data sizes less than the given data size. The encrypted data segments of data sizes less than the given data size may include encrypted entire data objects in some cases.

The process 600 includes computing (at 608) a measure based on a first quantity (e.g., X) of the I/O operations in the first subset of I/O operations involving the encrypted data segments of the given data size, and on a second quantity (e.g., Z) of the I/O operations in the second subset of I/O operations involving the encrypted data segments of data sizes less than the given data size.

The process 600 includes determining (at 610), based on the measure, whether an intermittent encryption attack is occurring with respect to the storage system. For example, the measure can be compared against one or more attack thresholds.

A storage medium (e.g., 400 in FIG. 4 or 504 in FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:

identify, from among a plurality of input/output (I/O) operations with a storage system, a collection of I/O operations involving data segments of a first data size;

determine whether a quantity of I/O operations in the collection of I/O operations involving the data segments of the first data size exceeds a quantity of I/O operations involving data segments of a second data size by greater than a specified margin; and responsive to determining that the quantity of I/O operations in the collection of I/O operations involving the data segments of the first data size exceeds the quantity of I/O operations involving the data segments of the second data size by greater than the specified margin:

identify, in the collection of I/O operations, a subset of I/O operations involving encrypted data segments of the first data size, wherein the collection of I/O operations involving the data segments of the first data size comprises the subset of I/O operations involving the encrypted data segments of the first data size, and I/O operations involving unencrypted data segments of the first data size;

compute a measure based on a ratio between a quantity of the I/O operations in the subset of I/O operations involving the encrypted data segments of the first data size and a total quantity of I/O operations in the collection of I/O operations; and determine, based on the measure, whether an intermittent encryption attack is occurring with respect to the storage system.

2. The non-transitory machine-readable storage medium of claim 1, wherein the I/O operations involving the data segments of the first data size comprise a most frequently occurring I/O operations in the plurality of I/O operations, and the I/O operations involving the data segments of the second data size comprise a next most frequently occurring/O operations in the plurality of I/O operations.

3. The non-transitory machine-readable storage medium of claim 1, wherein the instructions upon execution cause the system to:

indicate that no intermittent encryption attack is occurring responsive to determining that the quantity of I/O operations in the collection of I/O operations involving the data segments of the first data size does not exceed the quantity of I/O operations involving the data segments of the second data size by greater than the specified margin.

4. The non-transitory machine-readable storage medium of claim 1, wherein the intermittent encryption attack encrypts one or more sub-portions of a data object.

5. The non-transitory machine-readable storage medium of claim 4, wherein the instructions upon execution cause the system to:

identify, from among the plurality of I/O operations, a further subset of I/O operations involving encrypted data segments of data sizes less than the first data size, wherein the measure is computed further based on a quantity of the I/O operations in the further subset of I/O operations involving the encrypted data segments of data sizes less than the first data size.

6. The non-transitory machine-readable storage medium of claim 5, wherein the instructions upon execution cause the system to:

identify, from among the plurality of I/O operations, a further collection of I/O operations involving data segments of data sizes less than the first data size, wherein the further subset of I/O operations is part of the further collection of I/O operations, wherein the measure is computed further based on a quantity of the I/O operations in the further collection of I/O operations involving the data segments of data sizes less than the first data size.

7. The non-transitory machine-readable storage medium of claim 6, wherein the measure is based on a ratio of the quantity of the I/O operations in the further subset of I/O operations and the quantity of the I/O operations in the further collection of I/O operations.

8. The non-transitory machine-readable storage medium of claim 5, wherein the I/O operations of the further subset of I/O operations comprise a write of a data object that has been entirely encrypted.

9. The non-transitory machine-readable storage medium of claim 1, wherein the instructions upon execution cause the system to:

determine that the I/O operations in the subset of I/O operations involve encrypted data based on computing an entropy of data segments of the I/O operations in the subset of I/O operations.

10. The non-transitory machine-readable storage medium of claim 1, wherein the instructions upon execution cause the system to:

based on the measure satisfying a first criterion, generate an error condition in the system.

11. The non-transitory machine-readable storage medium of claim 10, wherein the instructions upon execution cause the system to:

based on the measure satisfying a second criterion, disable writes to the storage system.

12. The non-transitory machine-readable storage medium of claim 1, wherein the identifying of the subset of I/O operations comprises identifying data writes of encrypted data to the storage system.

13. A system comprising:

a hardware processor; and a non-transitory storage medium storing instructions executable on the hardware processor to:

identify, from among a plurality of input/output (I/O) operations with a storage system, a first collection of I/O operations involving data segments of a first data size;

determine whether a quantity of I/O operations in the first collection of I/O operations involving the data segments of the first data size exceeds a quantity of I/O operations involving data segments of a second data size by greater than a specified margin; and responsive to determining that the quantity of I/O operations in the first collection of I/O operations involving the data segments of the first data size exceeds the quantity of I/O operations involving the data segments of the second data size by greater than the specified margin:

identify, from the first collection of I/O operations, a first subset of I/O operations involving encrypted data segments of the first data size, wherein the first collection of I/O operations comprises the first subset of I/O operations involving the encrypted data segments of the first data size, and a second subset of I/O operations involving unencrypted data segments of the first data size;

compute a measure based on a ratio between a first quantity of the I/O operations in the first subset of I/O operations involving the encrypted data segments of the first data size, and a total quantity of the I/O operations in the first collection of I/O operations; and determine, based on the measure, whether an intermittent encryption attack is occurring with respect to the storage system.

14. The system of claim 13, wherein the I/O operations involving the data segments of the first data size comprise a most frequently occurring I/O operations in the plurality of I/O operations, and the I/O operations involving the data segments of the second data size comprise a next most frequently occurring/O operations in the plurality of I/O operations.

15. The system of claim 13, wherein the instructions are executable on the hardware processor to:

identify, from among the plurality of I/O operations, a second collection of I/O operations involving data segments of data sizes less than the first data size, wherein the measure is computed further based on a total quantity of the I/O operations in the second collection of I/O operations involving the data segments of data sizes less than the first data size.

16. The system of claim 15, wherein the instructions are executable on the hardware processor to:

identify, from the second collection of I/O operations, a second subset of I/O operations involving encrypted data segments of data sizes less than the first data size, wherein the measure is computed further based on:

a ratio of a second quantity of the I/O operations in the second subset of I/O operations and the total quantity of the I/O operations in the second collection of I/O operations.

17. A method comprising:

monitoring, by a system comprising a hardware processor, a plurality of input/output (I/O) operations that involve writes of data segments to a storage system;

identifying, by the system from among the plurality of I/O operations, a collection of I/O operations involving data segments of a first data size;

determining, by the system, whether a quantity of I/O operations in the collection of I/O operations involving the data segments of the first data size exceeds a quantity of I/O operations involving data segments of a second data size by greater than a specified margin; and based on determining that the quantity of I/O operations in the collection of I/O operations involving the data segments of the first data size exceeds the quantity of I/O operations involving the data segments of the second data size by greater than the specified margin:

identifying, by the system from the collection of I/O operations, a first subset of I/O operations involving encrypted data segments of the first data size, wherein the collection of I/O operations comprises the first subset of I/O operations involving the encrypted data segments of the first data size, and a second subset of I/O operations involving unencrypted data segments of the first data size;

computing, by the system, a measure based on a ratio between a first quantity of the I/O operations in the first subset of I/O operations involving the encrypted data segments of the first data size, and a total quantity of the I/O operations in the collection of I/O operations; and determining, by the system based on the measure, whether an intermittent encryption attack is occurring with respect to the storage system.

18. The method of claim 17, further comprising:

indicating, by the system, that no intermittent encryption attack is occurring based on determining that the quantity of I/O operations in the collection of I/O operations involving the data segments of the first data size does not exceed the quantity of I/O operations involving the data segments of the second data size by greater than the specified margin.

* * * * *